United States Patent
Nakajima et al.

(10) Patent No.: US 6,359,398 B1
(45) Date of Patent: Mar. 19, 2002

(54) METHOD TO CONTROL CRT PHOSPHOR AGING

(75) Inventors: Yoshimitsu Nakajima, Irvine, CA (US); Masayoshi Shinobu, Kyoto (JP); Jeffrey G. Whitelaw, Corona, CA (US)

(73) Assignee: Mitsubishi Digital Electronics America Inc., Irvine, CA (US)

( * ) Notice: Subject to any disclaimer, the term of this patent is extended or adjusted under 35 U.S.C. 154(b) by 0 days.

(21) Appl. No.: 09/450,942

(22) Filed: Nov. 29, 1999

(51) Int. Cl.⁷ .............................. G09G 1/04
(52) U.S. Cl. .............. 315/369; 315/364; 315/367; 348/123
(58) Field of Search .............. 315/364, 367, 315/369; 358/12, 141, 180, 160; 348/173

(56) References Cited

U.S. PATENT DOCUMENTS

| | | | |
|---|---|---|---|
| 4,951,149 A | 8/1990 | Faroudja | 358/230 |
| 4,959,717 A | 9/1990 | Faroudja | 358/147 |
| 4,963,979 A | 10/1990 | Sendelweck | 358/37 |
| 5,005,080 A | 4/1991 | Kanda | 358/160 |
| 5,177,609 A * | 1/1993 | Kawakami et al. | 358/140 |
| 5,193,006 A | 3/1993 | Yamazaki | 358/242 |
| 5,249,049 A * | 9/1993 | Kranawetter et al. | 358/141 |
| 5,343,238 A | 8/1994 | Takata et al. | 348/556 |
| 5,442,403 A | 8/1995 | Yasumoto et al. | 348/432 |
| 5,479,186 A | 12/1995 | McManus et al. | 345/11 |
| 5,557,344 A | 9/1996 | Chen | 348/809 |
| 5,592,238 A | 1/1997 | Ogino et al. | 348/744 |
| 5,596,248 A | 1/1997 | Hosoi et al. | 315/368 |
| 5,821,917 A * | 10/1998 | Cappels | 345/150 |
| 5,864,370 A * | 1/1999 | Knox et al. | 348/674 |
| 5,894,203 A | 4/1999 | Lee | 315/387 |
| 5,912,663 A | 6/1999 | Cheng | 345/184 |
| 5,920,361 A | 7/1999 | Gibeau et al. | 348/750 |

* cited by examiner

*Primary Examiner*—Don Wong
*Assistant Examiner*—Shih-Chao Chen
(74) *Attorney, Agent, or Firm*—Lyon & Lyon LLP

(57) ABSTRACT

Methods and apparatus are provided for equally aging a cathode ray tube (CRT). A video input terminal is coupled to the CRT and receives an external video signal. Control circuitry is provided, which detects the aspect ratio of the signal and determines whether there is a mismatch between the signal aspect ratio and an aspect ratio of a display screen in association with the CRT. If a mismatch between the signal aspect ratio and the screen aspect ratio exists, an equalization video signal is derived from the external video signal. A primary region of the CRT is illuminated in response to the external video signal, and a secondary region of the CRT, which would otherwise be unilluminated in response to the external video signal due to the mismatch between the signal aspect ratio and the screen aspect ratio, is illuminated in response to the equalization video signal. In this manner, the CRT is uniformly aged.

37 Claims, 7 Drawing Sheets

METHOD TO CONTROL CRT PHOSPHOR AGING

This application is related to application Ser. No. 09/450,820, which is expressly incorporated herein by reference and filed on the same date.

FIELD OF THE INVENTION

This invention relates to methods and apparatus for use in conjunction with display device. Most particularly, these inventions relate to methods and apparatus for uniformly aging one or more cathode ray tubes (CRT's) within a display device, such as a television.

BACKGROUND OF THE INVENTION

All televisions utilize one or more cathode ray tubes (CRT's) to transform video information into light rays for display on the television screen. This is typically accomplished by exciting the phosphor material on the CRT with a scanned beam of electrons, causing the phosphor material to output light. Typically, over time, usage of the CRT causes aging or reduction of light output from the CRT phosphor material. When the entire nominal scan area of the CRT phosphor is excited (i.e., the area of the CRT phosphor corresponding to the geometry of the television screen), the CRT phosphor material is uniformly aged, resulting in an unnoticeable uniform reduction of light from the CRT. Under such circumstances, this phenomenon is typically not problematic. When only a portion of the nominal scan area of the CRT phosphor is excited over a period of time, however, the CRT phosphor is non-uniformly aged, resulting in a noticeable non-uniform reduction of light from the CRT.

This problem typically arises when video signals formatted with one aspect ratio are displayed on a television formatted in another different aspect ratio. The aspect ratio of a television picture image is a ratio of horizontal length to vertical length, expressed in relative units. Standard video signals, such as NTSC and PAL video signals, are formatted with a 4:3 aspect ratio (i.e., 1.33 aspect ratio), whereas non-standard video signals, such as HDTV video signals, are formatted with an aspect ratio greater than the standard 4:3 aspect ratio. For example, an HDTV video signal is typically formatted with a 16:9 aspect ratio (i.e., 1.77 aspect ratio). Modern cinematographic theater movies, not made expressly for conventional television, are typically films with aspect ratios greater than 1.33, typically ranging between 1.65 and 2.35.

When standard video signals are displayed on a standard television screen (i.e., a television screen having a 1.33 aspect ratio), the picture image appears on the entire television screen. As long as these standard video signals are displayed on a standard television screen, the associated CRT or CRT's are uniformly illuminated, and thus uniformly aged. When a non-standard video signal, such as an HDTV video signal, is displayed on a standard television screen, the picture image appears on the middle horizontal region of the television screen and black bars appear on the respective top and bottom horizontal regions of the television screen. As a result, a region of the CRT that would normally be illuminated in response to a standard video signal is not illuminated in response to the non-standard video signal.

Thus, without correction, display of a non-standard video signal on a standard television screen over an extended period of time causes the phosphor material disposed on a primary region of the CRT (represented by a middle horizontal region of the nominal CRT scan area) to age more than the phosphor material disposed on a secondary region of the CRT (represented by respective top and bottom horizontal regions of the nominal CRT scan area). When a standard video signal is then displayed on a standard television screen on which non-standard video signals have been displayed over an extended period of time, the top and bottom horizontal regions of the television screen will be distinctly brighter than the middle horizontal region of the television screen. These distinctions will appear as two respective spatial transition lines between the top and middle horizontal regions of the television screen and between the bottom and middle horizontal regions of the television screen. A similar phenomenon occurs when a standard video signal is displayed on a non-standard television screen for an extended period of time, causing the phosphor material on the middle vertical region of the nominal scanning area of the CRT to age more than the phosphor material disposed on the respective left and right vertical regions of the nominal scanning area of the CRT. Most viewers will complain about this phenomenon, which may require a service call to replace the CRT or CRT's. If the television is a projection television (PTV), which typically includes three color CRT's, this service call may cost $500 or more.

One method used to reduce this non-uniform CRT phosphor aging problem involves slowly moving the electron scanning angle over time, so that the spatial transition lines are blurred. Another method involves pre-aging the CRT phosphor with white video, which takes advantage of the fact that the problem of non-uniform CRT illumination lessens with time. These methods, however, only reduce the problem of non-uniform CRT illumination, and do not necessarily eliminate the problem. Still another method involves illuminating the respective top and bottom horizontal regions of the nominal CRT scan area with gray video when a non-standard video signal is displayed on a standard television screen, or illuminating the left and right vertical regions of the nominal CRT scan area with gray video when a standard video signal is displayed on a non-standard television screen. This method, however, requires the luminous intensity of the gray video to match an average luminous intensity of the program video. This estimation is not perfect, resulting in a reduced, but still present, non-uniform aging of the CRT.

Accordingly, an improved method and apparatus for uniformly aging the phosphor material on a CRT is desired.

SUMMARY OF THE INVENTION

Methods and apparatus are utilized for uniformly aging the phosphor material on a CRT. The method serves to uniformly age a CRT irrespective of the aspect ratio in which a received external video signal is formatted. The CRT may be located in a television, such as a projection television, a computer monitor, or any other device that uses a CRT to transform a video signal into light output.

A preferred method includes receiving an external video signal that includes a signal aspect ratio that is different from the aspect ratio of the television screen. By way of non-limiting example, if the CRT has an aspect ratio of 4:3, illumination of CRT at a 16:9 aspect ratio (resulting from the illumination of the CRT in response-to a non-standard video signal containing video material formatted with a 16:9 aspect ratio, such as HDTV video material) will cause a primary region of the CRT, represented as a middle horizontal region, to be illuminated, and a secondary region of the CRT, represented as respective top and bottom horizontal regions, to be non-illuminated. By way of further non-limiting example, if the CTR has an aspect ratio of 16:9, illumination of CTR at a 4:3 aspect ratio (resulting from the illumination of the CRT in response to a standard video signal containing video material formatted with a 4:3 aspect ratio, such as NTSC video material) will cause a primary region of the CRT, represented as a middle vertical region, to be illuminated, and a secondary region of the CRT, represented as respective left and right vertical regions, to be non-illuminated.

To facilitate uniform aging of the CRT, a CRT age equalization video signal is derived from the external video signal. The equalization video signal is based on the signal aspect ratio of the external video signal, such that the secondary region of the CRT, which is non-illuminated in response to the external video signal, is illuminated in response to the equalization video signal. Preferably, the derivation of the equalization video signal is accomplished by duplicating of mirroring a portion of the external video signal corresponding to the portion of the primary CRT region adjacent to the secondary CRT region. In this manner, matching of the illumination intensities of the respective primary and secondary CRT regions is ensured.

To prevent viewing of a secondary image resulting in duplicating or mirroring of the external video signal, which may otherwise be distracting to the viewer, the secondary image is blocked by use of means, such as CRT covers, external screen doors or internal screen doors. This blocking means may be automatically controlled upon detection of the existence of a mismatch between the signal aspect ratio and the screen aspect ratio, or may be manually or remotely performed by the user upon detection of the secondary image on the television screen.

In the preferred embodiment, the equalization video signal is derived by digitizing the external video signal through an analog-to-digital converter and storing the external video signal in memory. Control circuitry, such as a microcomputer, is employed to read the stored digitized data out of the memory in a particular order, thereby outputting a digitized equalization video signal. The manner in which the stored digitized data is read from the memory is based on the signal aspect ratio of the external video signal. The signal aspect ratio can be detected using a variety of methods, which may include measuring the active portion versus the total portion of a horizontal line within the external video signal and/or the number of active horizontal lines versus the total number of horizontal lines within the external video signal, or alternatively, by detecting signal aspect ratio data encoded within the external video signal.

The digitized equalization video signal is then converted into an analog equalization video signal, which is then combined with the external video signal in a combiner, resulting in a composite video signal. In the preferred embodiment, the combiner is a switch, which temporally combines the external video signal and equalization video signal into the composite video signal. The composite signal is transmitted to the CRT. In this manner, the entirety of the CRT, i.e., the respective primary and secondary CRT regions, is illuminated in response to the composite video signal.

DETAILED DESCRIPTION OF THE INVENTION

Figure 1:
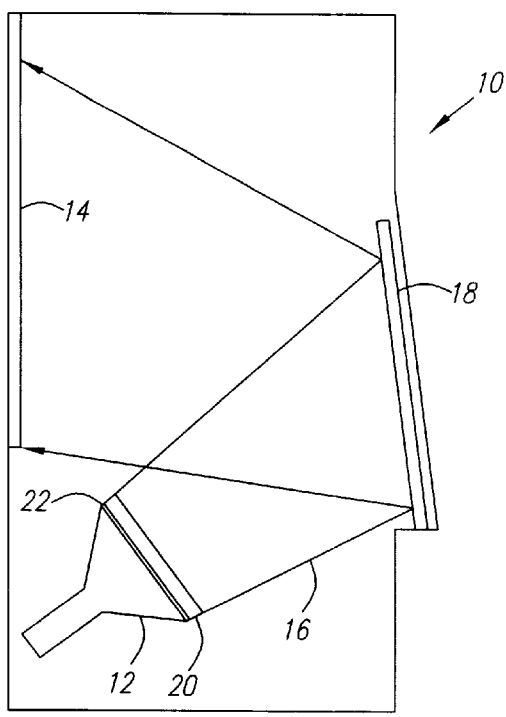
FIG. 1 shows a schematic plan view of a projection television system employing a cathode ray tube (CRT)

Referring to FIG. 1, a preferred embodiment of the present invention is employed to ensure uniform aging of the phosphor surface on each of one or more television cathode ray tubes (CRT's). In FIG. 1, a television 10, and particularly a projection television, comprises a CRT 12 for display of a video image on a projection television screen 14. It should be noted that more than one CRT can be provided to a television. For example, projection televisions typically include three CRT's arranged in a cross-wise fashion. Each of these three CRT's generates one of a distinct primary color image (red, green or blue), which are then combined on the television screen as a composite color image. For purposes of simplicity, however, only one CRT is described in this embodiment.

The CRT 12 serves to transform a video signal into light output 16, which is conveyed to and reflected off of a mirror 18 to the television screen 14 for viewing by the user. The CRT 12 includes a CRT screen 20. The CRT 12 further includes a phosphor layer 22 disposed on the back side of the CRT screen 20. The phosphor layer 22 is the active light output component, and emits the light output 16 in response to an electron beam incident thereon. As is standard practice, the electron beam scans back and forth in a raster format providing several hundred lines of resolution to the television screen 14.

Figure 2:
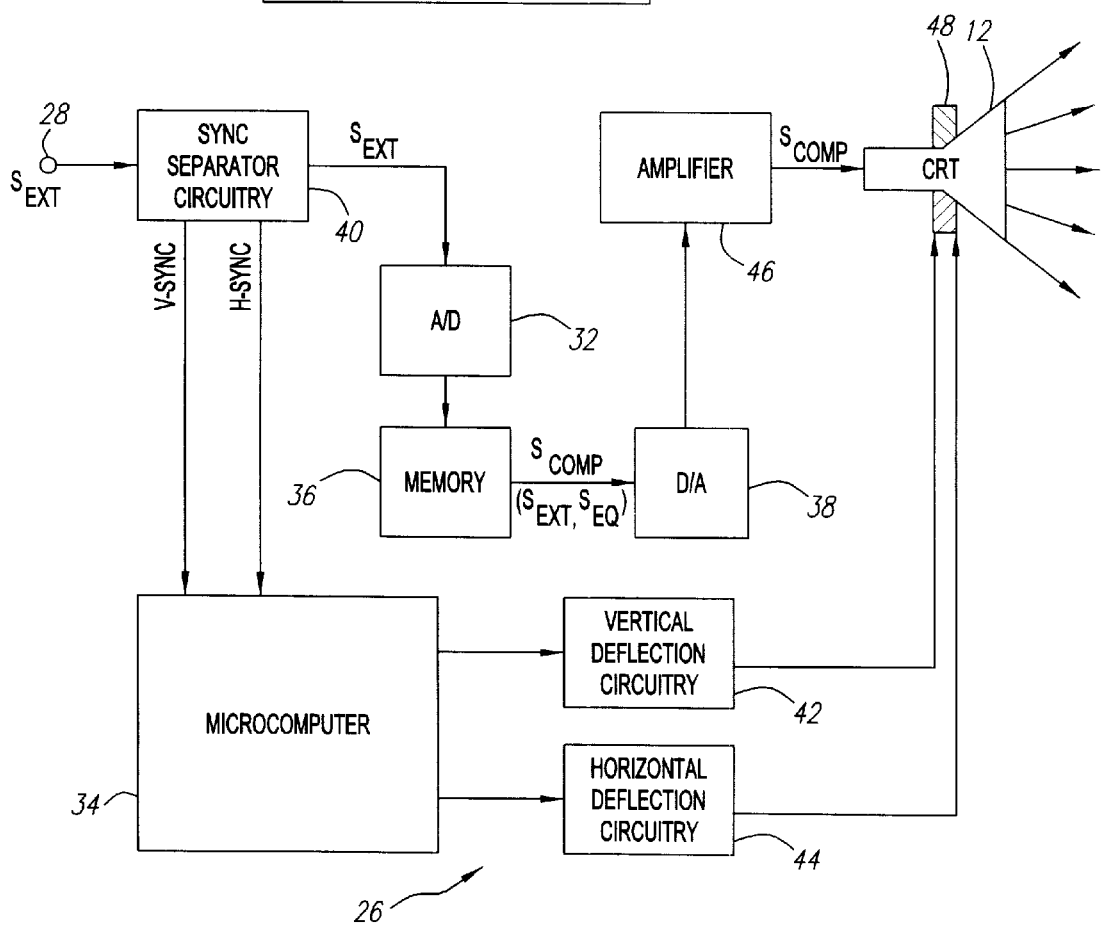
FIG. 2 is a representative block diagram of a preferred embodiment of CRT aging equalization circuitry employed to equalize the aging of the CRT depicted in FIG. 1.

Referring to FIG. 2, the television 10 includes CRT aging equalization circuitry 26, which advantageously ensures that the CRT 12 is uniformly aged. The equalization circuitry 26 includes a video input terminal 28, which serves to receive an external video signal $S_{EXT}$. The external video signal $S_{EXT}$ may originate from any source, such as a television station, cable system or satellite. Additional sources include a VCR and digital video disk (DVD). Typically, the external video signal $S_{EXT}$ is processed (e.g., by tuning, amplifying or modulating) using standard circuitry known in the art prior to delivery to the video input terminal 28.

The external video signal $S_{EXT}$ contains program material for viewing by the user and can include video material formatted with various aspect ratios. For example, the video material may be formatted with a standard aspect ratio (i.e., a 4:3 aspect ratio) or a non-standard aspect ratio, such as e.g., High Definition Television (HDTV) video material formatted with a 16:9 aspect ratio.

Optimally, the entire nominal scan area of the CRT 12 (i.e., the nominal CRT scan area, the illumination of which illuminates the entire television screen) is illuminated in response to the scanned electron beam. This occurs when the external video signal $S_{EXT}$ is formatted with a signal aspect ratio equal to the aspect ratio of the television screen 14 (shown in FIG. 1). For instance, the entire nominal CRT scanning area may be illuminated if both the external video signal $S_{EXT}$ and the CRT 12 are standard (i.e., both have an aspect ratio of 4:3), or if both the external video signal $S_{EXT}$ and the CRT 12 are non-standard (e.g., both have an aspect ratio of 16:9). There are instances, however, when only a portion of the nominal CRT scan area is illuminated in response to the scanned electron beam. This occurs when the external video signal $S_{EXT}$ is formatted with a signal aspect ratio unequal to the aspect ratio of the television screen 14, i.e., a mismatch between the signal aspect ratio and the screen aspect ratio exists. For example, only a portion of the nominal CRT scan area may be illuminated if the external video signal $S_{EXT}$ is standard and the CRT 12 is non-standard (e.g., the signal aspect ratio is 4:3 and the screen aspect ratio is 16:9), or if the external video signal $S_{EXT}$ is non-standard and the CRT 12 is standard (e.g., the signal aspect ratio is 16:9 and the screen aspect ratio is 4:3). Only a portion of the nominal CRT scan area may be illuminated if both the video signal $S_{EXT}$ and the CRT 12 are both non-standard but having differing aspect ratios (e.g., if the signal aspect ratio is 2:1 and the screen aspect ratio is 16:9).

Figure 3:
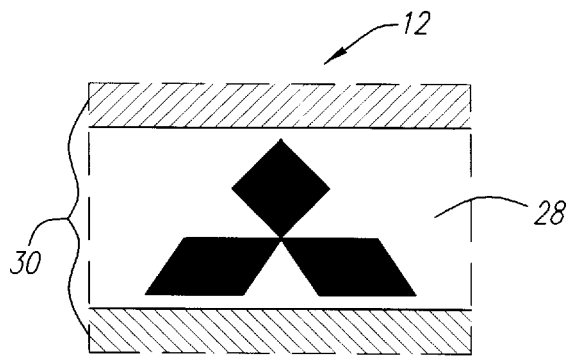
FIG. 3 is a front view of the nominal scan area of a CRT, wherein the CRT is being illuminated in a non-uniform manner, such that the middle horizontal region of the CRT is illuminated and the top and bottom horizontal regions of the CRT are non-illuminated.
Figure 4:
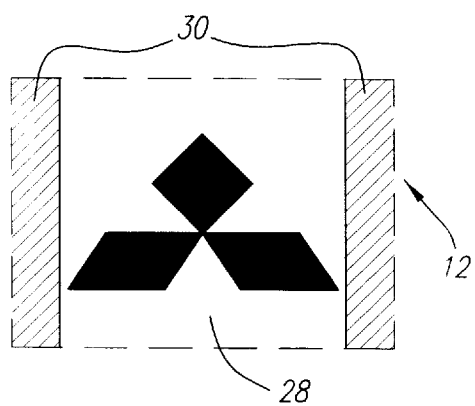
FIG. 4 is a front view of the nominal scan area of a CRT, wherein the CRT is being illuminated in a non-uniform manner, such that the middle vertical region of the CRT is illuminated and the left and right vertical regions of the CRT are non-illuminated.

In particular, and with reference to FIG. 3, an illuminated primary CRT region 28 (represented by the middle horizontal region of the CRT 12), and a non-illuminated secondary CRT region 30 (represented by respective top and bottom horizontal regions of the CRT 12) are illustrated. The CRT illumination scenario depicted in FIG. 3 typically results when the signal aspect ratio is greater than the screen aspect ratio. Similarly, and with reference to FIG. 4, an illuminated primary CRT region 28 (represented by the middle vertical region of the CRT 12) and a non-illuminated secondary CRT region 30 (represented by respective left and right vertical regions of the CRT 12) are illustrated. The CRT illumination scenario depicted in FIG. 4 typically results when the signal aspect ratio is less than the screen aspect ratio. Without correction, the CRT 12 in the above CRT illumination scenarios will age in a non-uniform manner over a period of time.

Referring back to FIG. 2, the equalization circuitry 26 compensates for any mismatch between the signal aspect ratio and the screen aspect ratio. In particular, the television equalization circuitry includes an analog-to-digital (A/D) converter 32, control circuitry 34, memory 36, and a digital-to-analog (D/A) converter 38. The A/D converter 32 is electrically coupled to the video input terminal 28 and serves to digitize the external video signal $S_{EXT}$. The memory 36, which can take the form of line memory or field memory, is electrically coupled to the A/D converter 32 and serves to store the digitized external video signal $S_{EXT}$. The writing and reading of the digitized external video signal $S_{EXT}$ is controlled by the control circuitry 34. As will be described in further detail below, the microcomputer 34 derives a composite digitized video signal $S_{COMP}$ from the digitized external video signal $S_{EXT}$ by reading the digitized data from the memory 36 in a particular order. In the illustrated embodiment, the control circuitry 34 is a microcomputer. The control circuitry 34, however, could be implemented using a microprocessor, microcontroller, logic, or any other circuitry that can be used to control input and output of memory.

As will be described in further detail below, a first portion of the composite digitized video signal $S_{COMP}$ is composed of the digitized external video signal $S_{EXT}$. If the signal aspect ratio does not match the screen aspect ratio, a second portion of the composite digitized video signal $S_{COMP}$ will be composed of a digitized CRT aging equalization video signal $S_{EQ}$ derived from the digitized external video signal $S_{EXT}$. The equalization video signal $S_{EQ}$ corresponds to the secondary CRT region 30 (shown in FIGS. 3 and 4) and facilitates the uniform aging of the CRT 12. If the signal aspect ratio does match the screen aspect ratio, the digitized composite video signal $S_{COMP}$ will be composed entirely of the external video signal $S_{EXT}$. The microcomputer 34 can determine the signal aspect ratio by comparing, for each video field, the active video versus total video for a horizontal line and/or number of horizontal lines in which active video is contained versus the total number of horizontal lines. Alternatively, the signal aspect ratio can be determined by detecting a signal aspect ratio indicator encoded within the external video signal $S_{EXT}$. The D/A converter 38 is electrically coupled to the output of the memory 36 and serves to convert the digitized composite video signal $S_{COMP}$ into an analog composite video signal $S_{COMP}$.

The equalization circuitry 26 further includes sync separator circuitry 40, which separates the respective horizontal and vertical synchronizing signals V-SYNC and H-SYNC from the external video signal $S_{EXT}$. The V-SYNC and H-SYNC signals are provided to the microcomputer 34, which produces screen control signals in response to the V-SYNC and H-SYNC signals. The screen control signals are conveyed to vertical deflection circuitry 42 and horizontal deflection circuitry 44 for output to a deflection yoke 48 located on the CRT 12. In this manner, the CRT 12 is raster scanned with the electron beam in response to the composite video signal $S_{COMP}$, as dictated by the V-SYNC and H-SYNC signals. The equalization circuitry 26 further includes an amplifier 46 for amplifying the composite video signal $S_{COMP}$ prior to conveyance to the CRT 12, where it is transformed into the scanned electron beam.

Figure 6:
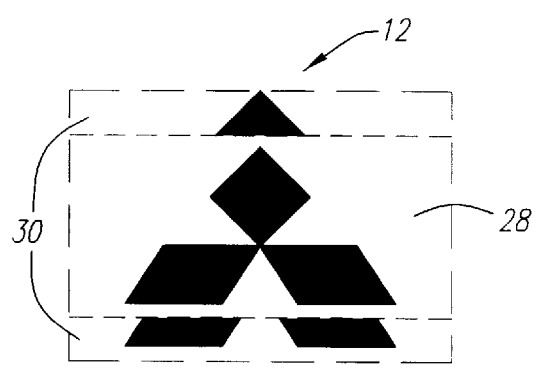
FIG. 6 is a front view of the nominal scan area of a CRT, wherein the top and bottom horizontal regions of the CRT are illuminated with a secondary image derived by duplicating a portion of the main image.
Figure 7:
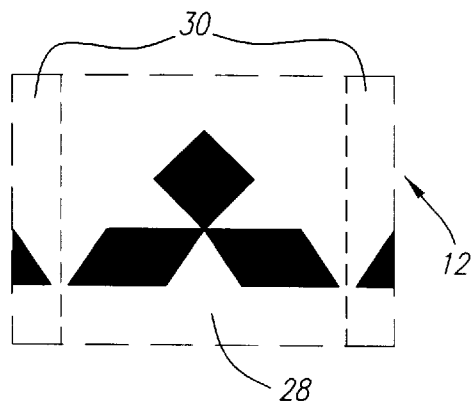
FIG. 7 is a front view of the nominal scan area of a CRT, wherein the left and right vertical regions of the CRT are illuminated with a secondary image derived by mirroring a portion of the main image.
Figure 8:
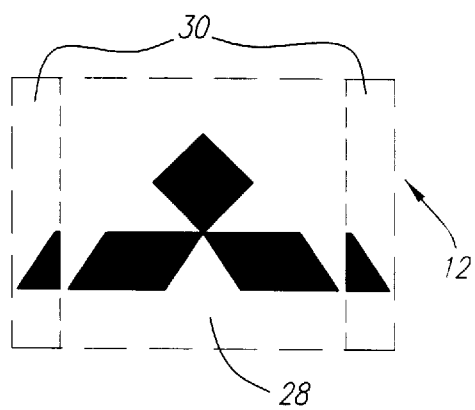
FIG. 8 is a front view of the nominal scan area of a CRT, wherein the left and right vertical regions of the CRT are illuminated with a secondary image derived by duplicating a portion of the main image.

As mentioned above, a portion of the composite video signal $S_{COMP}$ is composed of the external video signal $S_{EXT}$. Thus, in response to the composite video signal $S_{COMP}$, the primary CRT region 28 is illuminated. For example, if the external video signal $S_{EXT}$ is non-standard, and the CRT 12 is standard, the primary CRT region 28 will be illuminated in response to the composite video signal $S_{COMP}$, in the manner illustrated in FIGS. 5 and 7. If the external video signal $S_{EXT}$ is standard, and the CRT 12 is non-standard, the primary CRT region 28 will be illuminated in response to the composite video signal $S_{COMP}$, in the manner illustrated in FIGS. 6 and 8.

As also mentioned above, if there is a mismatch between the signal aspect ratio and the screen aspect ratio, a portion of the composite video signal $S_{COMP}$ will be composed of the equalization video signal $S_{EQ}$ corresponding to the secondary CRT region 30. With knowledge of the signal aspect ratio and the screen aspect ratio, the microcomputer 34 is able to derive the equalization video signal $S_{EQ}$, such that the particular secondary CRT region 30 resulting from any mismatch between the respective signal aspect ratio and screen aspect ratio is illuminated. Thus, not only is the primary CRT region 28 illuminated, but the secondary CRT region 30 is also illuminated in response to the composite video signal $S_{COMP}$.

Preferably, the equalization video signal $S_{EQ}$ is derived from a portion of the external video signal $S_{EXT}$ corresponding to the periphery of the primary CRT region 28, i.e., the portion of the primary CRT region 28 adjacent to the secondary CRT region 30. In this manner, the intensity of the illuminated secondary CRT region 30 closely matches the intensity of the illuminated primary CRT region 28. Matching of the respective primary CRT region 28 and secondary CRT region 30 illumination intensities can be accomplished by mirroring the external video signal $S_{EXT}$, and particularly the portion of the external video signal $S_{EXT}$ corresponding to the periphery of the primary CRT region 28.

Figure 5:
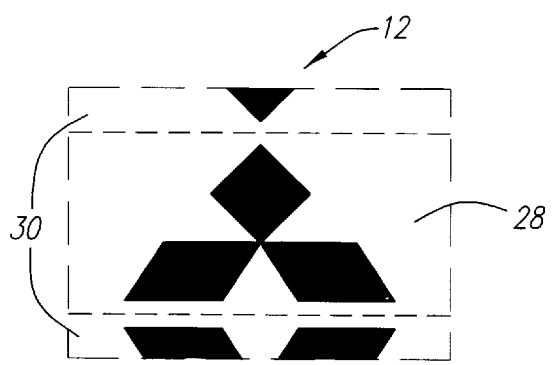
FIG. 5 is a front view of the nominal scan area of a CRT, wherein the top and bottom horizontal regions of the CRT are illuminated with a secondary image derived by mirroring a portion of the main image.

For example, if the external video signal $S_{EXT}$ is non-standard, and the CRT 12 is standard, mirroring of the external video signal $S_{EXT}$ will cause the secondary CRT region 30 to be illuminated in response to the composite video signal $S_{COMP}$, in the manner illustrated in FIG. 5. If the external video signal $S_{EXT}$ is standard, and the CRT 12 is non-standard, mirroring of the external video signal $S_{EXT}$ will cause the primary CRT region 28 to be illuminated in response to the composite video signal $S_{COMP}$, in the manner illustrated in FIG. 7.

Alternatively, matching of the respective primary CRT region 28 and secondary CRT region 30 illumination intensities can be accomplished by duplicating the external video signal $S_{EXT}$, and particularly the portion of the external video signal $S_{EXT}$ corresponding to the periphery of the primary CRT region 28. For example, if the external video signal $S_{EXT}$ is non-standard, and the CRT 12 is standard, mirroring of the external video signal $S_{EXT}$ will cause the secondary CRT region 30 to be illuminated in response to the composite video signal $S_{COMP}$, in the manner illustrated in FIG. 6. If the external video signal $S_{EXT}$ is standard, and the CRT 12 is non-standard, mirroring of the external video signal $S_{EXT}$ will cause the primary CRT region 28 to be illuminated in response to the composite video signal $S_{COMP}$, in the manner illustrated in FIG. 8. Preferably, the demarcation between the primary CRT region 28 and the secondary CRT region 30 is blurred or feathered to minimize the adverse effect that any difference in luminous intensities between the respective primary and secondary CRT regions 28 and 30 at the demarcation may have on the CRT 12.

Figure 9:
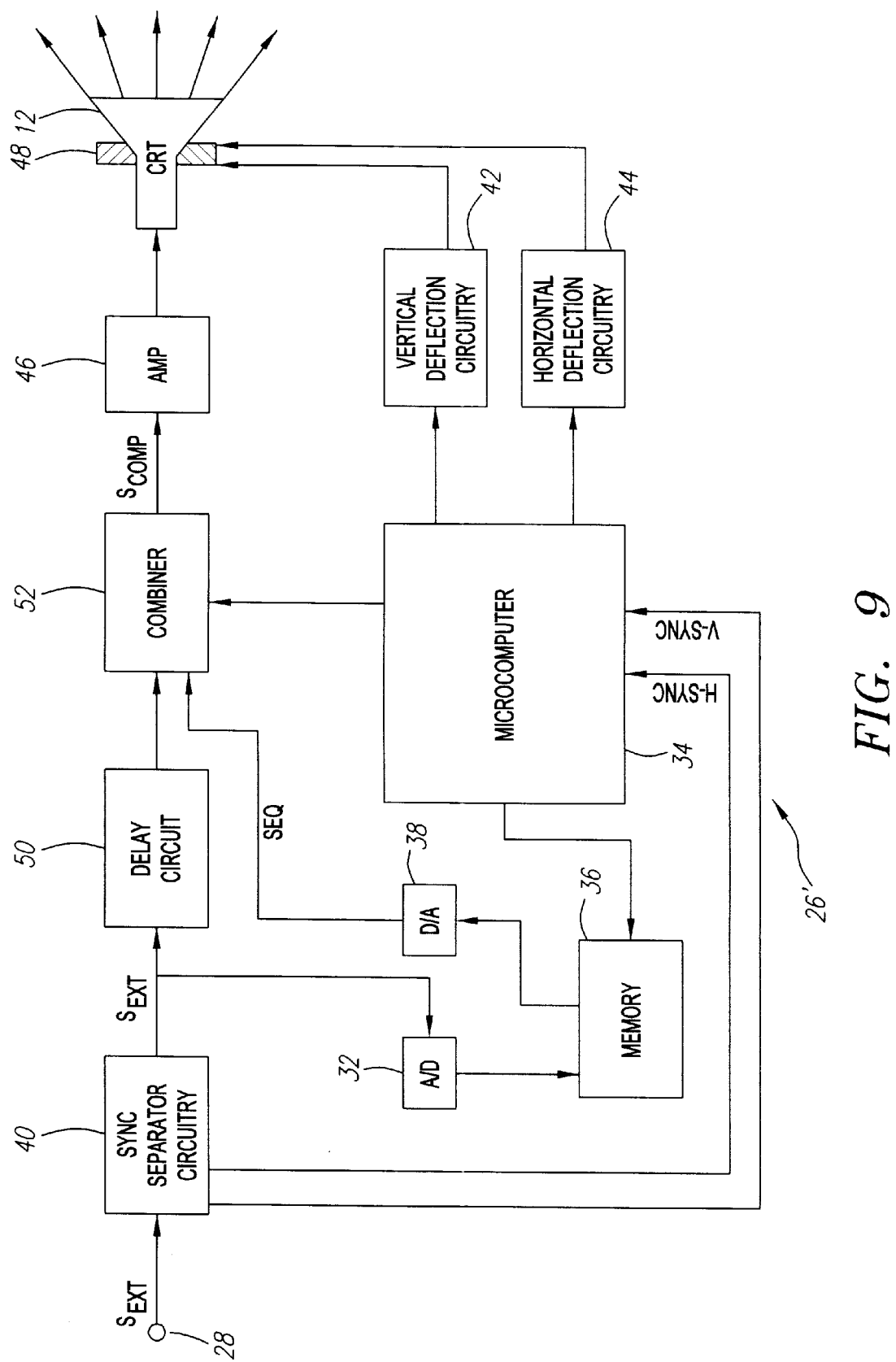
FIG. 9 is a representative block diagram of an alternatively preferred embodiment of CRT aging equalization circuitry employed to equalize the aging of the CRT depicted in FIG. 1.

Referring to FIG. 9, an alternative embodiment of an equalization circuit 26' is described. As discussed above with respect to the equalization circuit 26, the external video signal $S_{EXT}$ is digitized by the A/D converter 32 and stored in the memory 36. Instead of generating a digitized composite video signal $S_{COMP}$, however, the microcomputer 34 generates the digitized equalization video signal $S_{EQ}$ from the stored digitized external video signal $S_{EXT}$ by reading the data out of the memory 36 in a particular order. As discussed above, the digitized equalization video signal $S_{EQ}$ can be generated by duplicating or mirroring the portion of the external video signal corresponding to the periphery of the primary CRT region 28 (FIGS. 5–8). The digitized equalization video signal $S_{EQ}$ is then converted into an analog signal via the D/A converter 38.

The equalization circuit 26' further includes a delay circuit 50 electrically coupled to the video signal terminal 28 in parallel to the memory 36. The delay circuit 50 serves to delay transmission of the external video signal $S_{EXT}$, while the equalization video signal $S_{EQ}$ is generated. The equalization circuit 26' further includes a combiner 52, the inputs of which are electrically coupled to the output of the memory 36 and the video input terminal 28. In the illustrated embodiment, the combiner 52 is a switch. In this connection, the microcomputer 34 analyzes the digitized external video signal $S_{EXT}$ to determine if a mismatch between the signal aspect ratio and the screen aspect ratio exists. If so, the microcomputer 34 directs the switch 52 to temporally combine the external video signal $S_{EXT}$ and the equalization video signal $S_{EQ}$ into the composite video signal $S_{COMP}$. That is, the switch 52 alternately passes the external video signal $S_{EXT}$ and equalization video signal $S_{EQ}$ in a TDMA-type format. If a mismatch between the signal aspect ratio and the screen aspect ratio does not exist, the microcomputer 34 directs the switch 52 to continuously pass the external video signal $S_{EXT}$ as the composite video signal $S_{COMP}$. The switch 52 is electrically coupled to the amplifier 46, wherein the composite video signal $S_{COMP}$ is amplified and conveyed to the CRT 12 for display.

Figure 10:
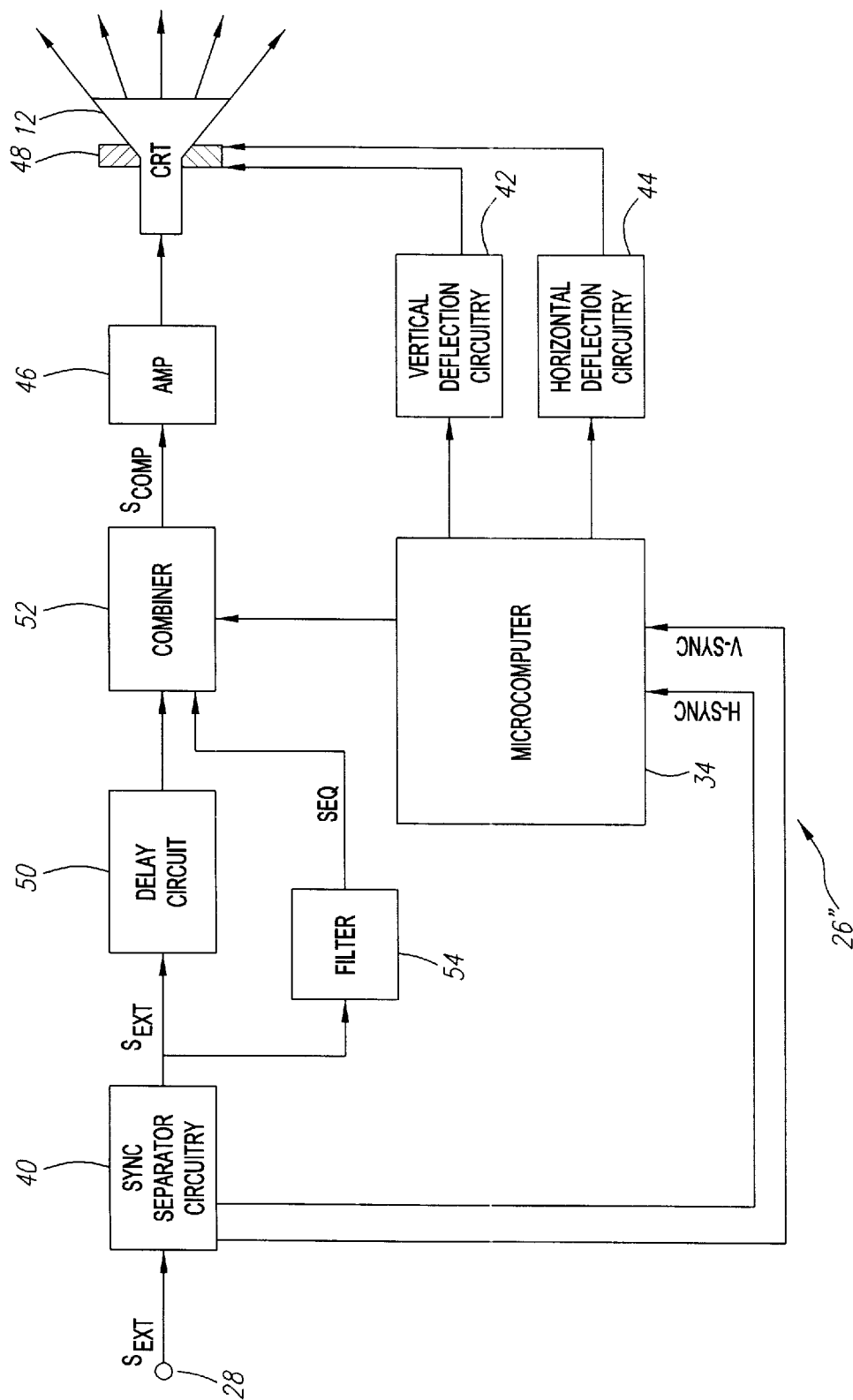
FIG. 10 is a representative block diagram of a further alternatively preferred embodiment of CRT aging equalization circuitry employed to equalize the aging of the CRT depicted in FIG. 1.

Referring to FIG. 10, an alternative embodiment of an equalization circuit 26" is described. The equalization video signal $S_{EQ}$ includes an analog filter 54 electrically coupled to the video input terminal 28. The analog filter 54 filters the external video signal $S_{EXT}$ and outputs the equalization video signal $S_{EQ}$. In particular, the filter 54 generates the equalization video signal $S_{EQ}$ by duplicating or mirroring a portion of the external video signal $S_{EXT}$ corresponding to the periphery of the primary CRT region 28 (shown in FIGS. 5–8). The transmission of the external video signal $S_{EXT}$ is delayed through the delay circuit 50, while the equalization video signal $S_{EQ}$ is generated.

The external video signal $S_{EXT}$ and the equalization video signal $S_{EQ}$ are combined by the combiner 52, and particularly the switch, under control by the microcomputer 34. The microcomputer 34 analyzes the digitized external video signal $S_{EXT}$ to determine if a mismatch between the signal aspect ratio and the screen aspect ratio exists. If so, the microcomputer 34 directs the switch 52 to temporally combine the external video signal $S_{EXT}$ and the equalization video signal $S_{EQ}$ into the composite video signal $S_{COMP}$. If a mismatch between the signal aspect ratio and the screen aspect ratio does not exist, the microcomputer 34 directs the switch 52 to continuously pass the external video signal $S_{EXT}$ as the composite video signal $S_{COMP}$. The switch 52 is electrically coupled to the amplifier 46, wherein the composite video signal $S_{COMP}$ is amplified and conveyed to the CRT 12 for display.

Figure 11:
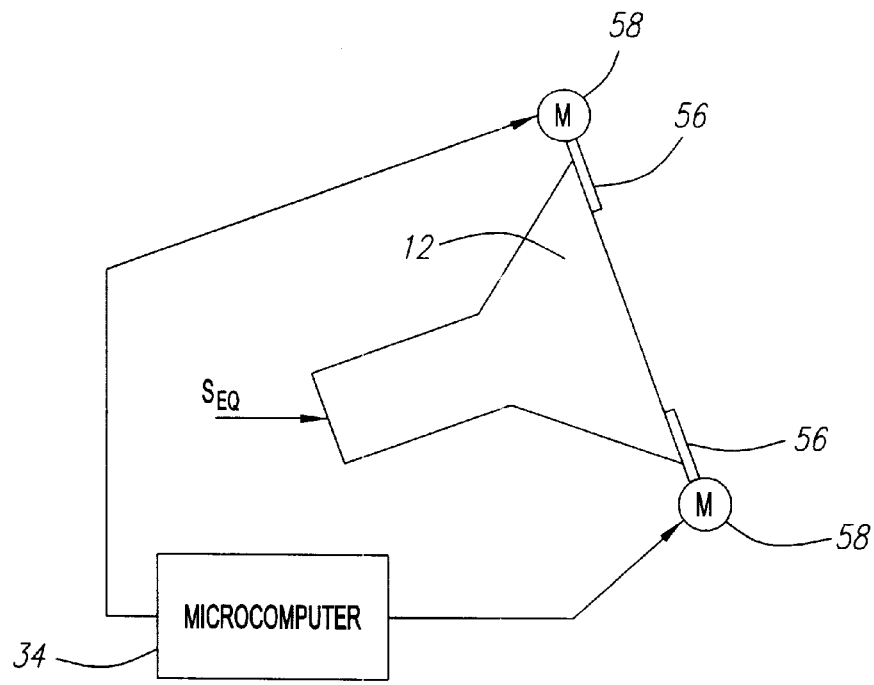
FIG. 11 is a schematic plan view showing a CRT cover placed in a closed position over the CRT shown in FIG. 1, wherein the secondary image is blocked.
Figure 12:
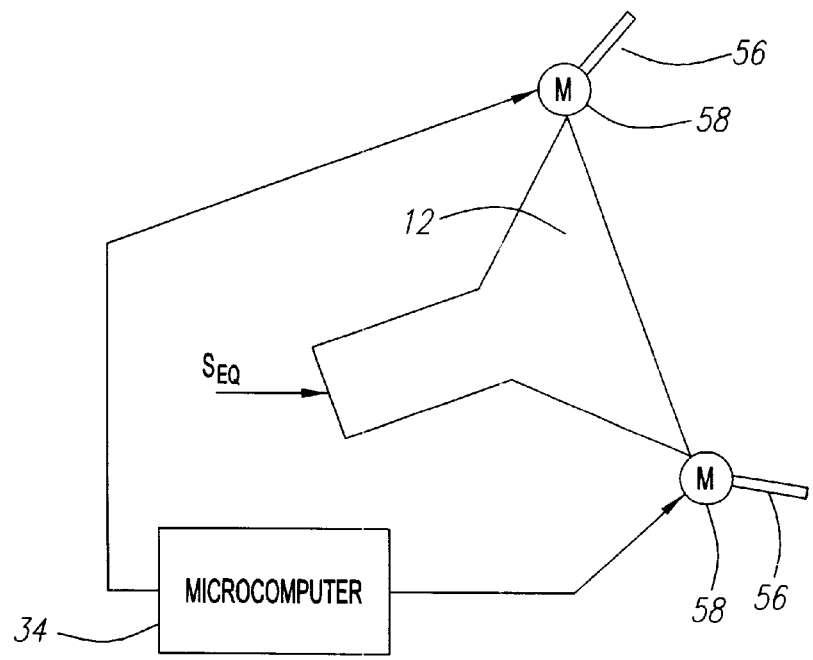
FIG. 12 is a schematic plan view showing the CRT cover of FIG. 11 placed in an open position, wherein the entire main image is not blocked.
Figure 13:
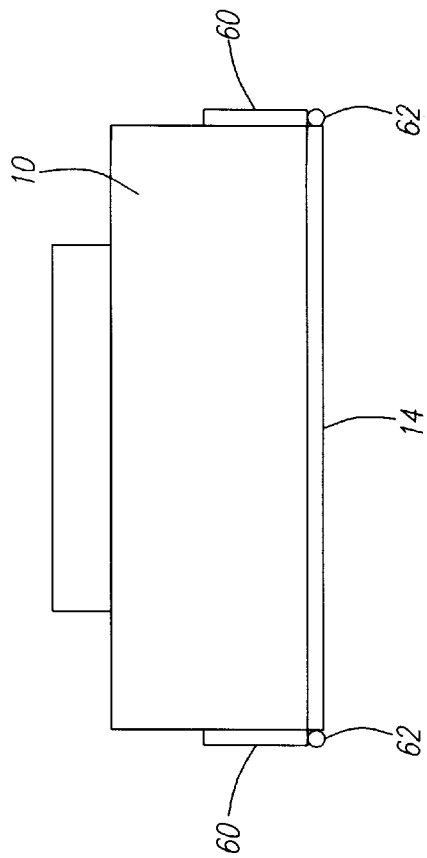
FIG. 13 is a schematic plan view showing an exterior door placed in a closed position over the television screen shown in FIG. 1, wherein the secondary image is blocked.
Figure 14:
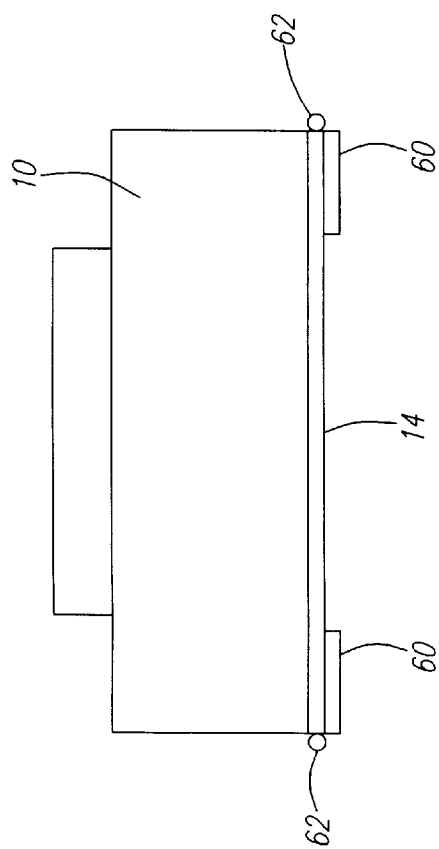
FIG. 14 is a schematic plan view showing the exterior door of FIG. 13 placed in an open position, wherein the entire main image is not blocked.

Referring to FIGS. 11–16, various means are provided for preventing viewing of the equalization video signal $S_{EQ}$ as an unwanted secondary image. Referring specifically to FIGS. 11 and 12, CRT covers 56 are provided to alternately cover and uncover the top and bottom horizontal regions of the CRT 12. The covers 56 may be fastened to the CRT or supporting CRT structure and function in a variety of ways, as described in further detail below. The CRT covers 56 may be composed of wood, plastic, metal or any other suitable material selected by the designer or manufacturer.

Upon determination that a mismatch exists between the signal aspect ratio and the screen aspect ratio, the CRT covers 56 are moved to a closed position (FIG. 11). In this manner, the equalization video signal $S_{EQ}$ is not displayed to the user, which would otherwise appear on the television screen 14 as two horizontal duplicated or mirrored portions of the main image. Upon determination that a mismatch between the signal aspect ratio and the screen aspect ratio does not exist, the CRT covers 56 are moved to an open position (FIG. 12). In the examples shown in FIGS. 11 and 12, a standard screen aspect ratio is assumed, with detection of non-standard signal aspect ratio effecting movement of the CRT covers 56 in the closed position (FIG. 11). If a non-standard screen aspect ratio is assumed, however, display of the equalization video signal $S_{EQ}$ would appear as two vertical duplicated or mirrored portions of the main image, thereby requiring the CRT covers 56 to alternately cover and uncover the left and right vertical regions of the CRT 12 upon determination that a mismatch exists between the signal aspect ratio and the screen aspect ratio.

In this connection, each of the CRT covers 56 is mechanically coupled to a motor 58, which rotates the respective CRT cover 56 between a closed position covering the CRT 12 (FIG. 11) and an open position uncovering the CRT 12 (FIG. 12). The microcomputer 34 is electrically coupled to the respective motors 58, allowing the microcomputer 34 to automatically cover the CRT 12 upon detection that a mismatch between the signal aspect ratio and the screen aspect ratio exists and uncover the CRT 12 upon detection that a mismatch between the signal aspect ratio and the screen aspect ratio does not exist. Alternatively, the microcomputer 34 can alternately cover and uncover the CRT 12 upon detection of a remote control signal transmitted by the user. In this case, the user can place the CRT covers 56 in the closed position via remote when the equalization video signal $S_{EQ}$ appears on the television screen 14 as a secondary image, and place the CRT covers 56 in the open position via remote when the equalization video signal $S_{EQ}$ does not appear on the television screen 14.

In alternative embodiments, exterior doors 60 can be placed on the exterior of the television screen 14 to block the region of the television screen 14 that would otherwise display the equalization video signal $S_{EQ}$ as the secondary image. In the embodiment illustrated in FIGS. 13 and 14, the exterior doors 60 alternately cover and uncover the left and right vertical regions of the television screen 14, which assumes a non-standard screen aspect ratio and a standard signal aspect ratio. Of course, the exterior doors 60 can be arranged to alternately cover and uncover the top and bottom horizontal regions of the television screen 14, which assumes a standard screen aspect ratio and a non-standard signal aspect ratio. The exterior doors 60 are hinged, and are thus mounted to respective hinges 62. The exterior doors 60 may be alternately opened and closed using means other than hinges. For instance, the exterior doors 60 may have a bi-fold/accordion structure, or the exterior doors 60 may be flexible, allowing the doors 60 to be alternately wrapped around and unwrapped from the rotatable cylinders. The exterior doors 60 may be considered as part of the cosmetics of the television 10, and may match or contrast the color and style of the television 10. The exterior doors 60 may be composed of wood, plastic, metal or any other suitable material as selected by the designer or manufacturer.

The exterior doors 60 may function manually, with the user appropriately placing the exterior doors 60 in the closed position (FIG. 13) when the equalization video signal $S_{EQ}$ is displayed on the television screen 14, and placing the exterior doors 60 in the open position (FIG. 14) when the equalization video signal $S_{EQ}$ is not displayed on the television screen 14. Like the CRT covers 56 disclosed above, the microcomputer 34 and motors 58 can alternatively be employed to automatically adjust the exterior doors 60 based on detection of a mismatch between the signal aspect ratio and the screen aspect ratio. Alternatively, the exterior doors 60 can be controlled via remote, based on user detection of the equalization video signal $S_{EQ}$ on the television screen 14.

Figure 15:
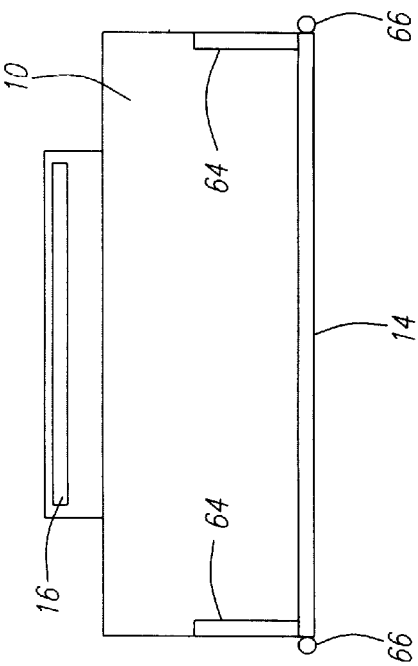
FIG. 15 is a schematic plan view showing an interior door placed in a closed position between the television screen and the projection mirror shown in FIG. 1, wherein the secondary image is blocked.
Figure 16:
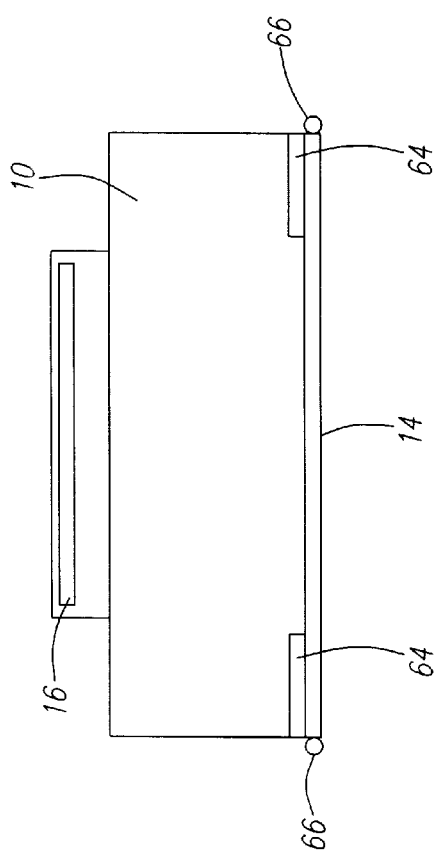
FIG. 16 is a schematic plan view showing the interior door of FIG. 15 placed in an open position, wherein the entire main image is not blocked.

In further alternative embodiments, interior doors 64 can be placed between the television screen 14 and the mirror 16 to block the region of the television screen 14 that would otherwise display the equalization video signal $S_{EQ}$, as illustrated in FIGS. 15 and 16. Like the exterior doors 60, the interior doors 64 can be controlled by the microcomputer 34, either automatically or remotely, to alternately place the interior doors 64 in a closed position (FIG. 15) or open position (FIG. 16).

Figure 17:
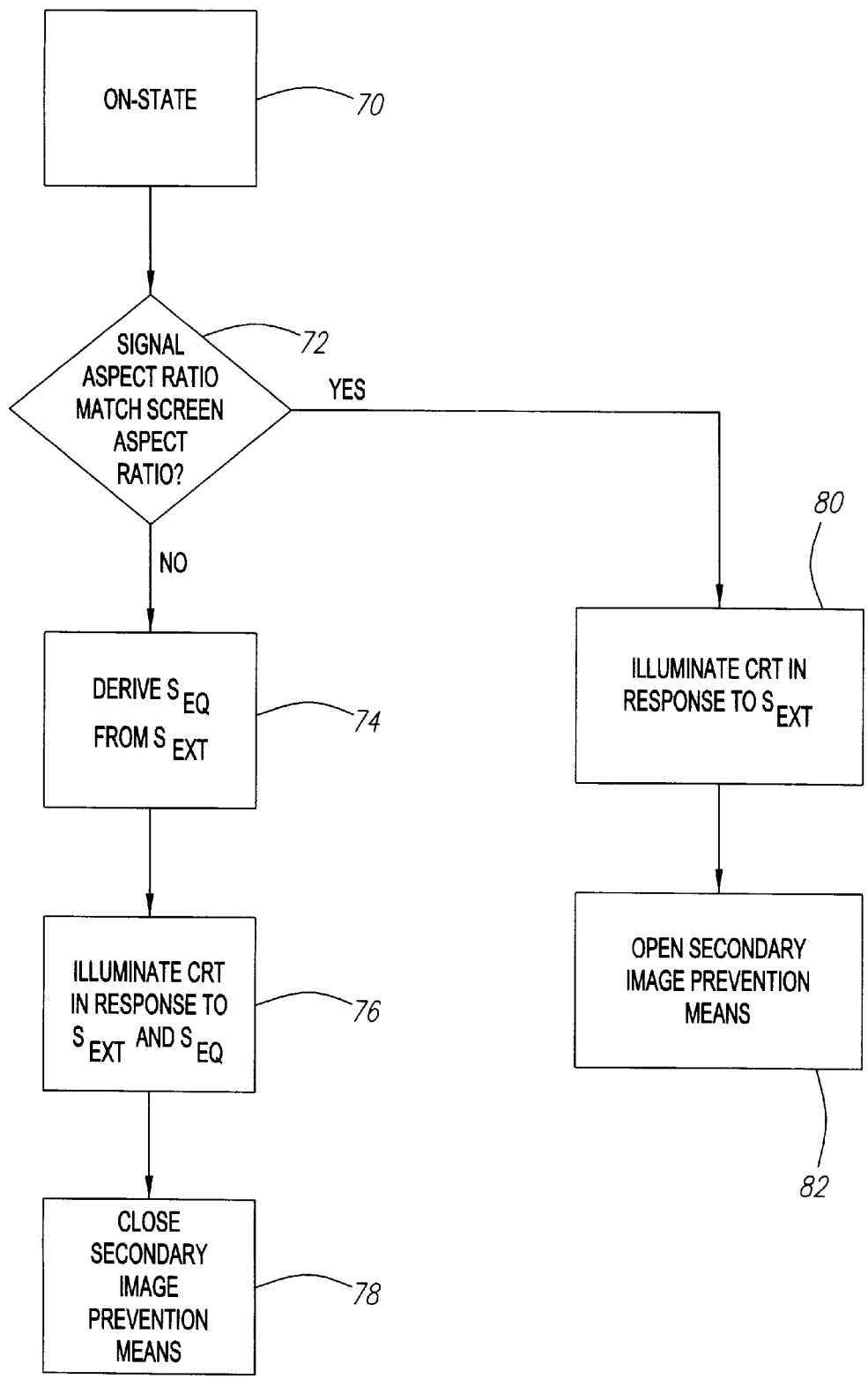
FIG. 17 is a flow diagram depicting the steps used by the control circuitry to equalize the aging of the CRT of FIG. 1.

FIG. 17 shows a flowchart of the methods utilized with this system. When the television 10 is in the on-state (block 70), the microcomputer 34 continuously detects the signal aspect ratio to determine whether a mismatch between the signal aspect ratio and the screen aspect ratio exists (block 72). If a mismatch between the signal aspect ratio and the screen aspect ratio does exist, the equalization video signal $S_{EQ}$ is derived from the external video signal $S_{EXT}$ (block 74). The primary CRT region 28 is illuminated in response to the external video signal $S_{EXT}$, and the secondary CRT region 30 is illuminated in response to the equalization video signal $S_{EQ}$ (block 76). The secondary image prevention means, whether it be CRT covers, exterior doors or interior doors, is placed in the closed position to prevent viewing of the equalization video signal $S_{EQ}$ (78). If a mismatch between the signal aspect ratio and the screen aspect ratio does not exist, the respective primary and secondary CRT regions 28 and 30 are illuminated solely in response to the external video signal $S_{EXT}$ (block 80). The secondary image prevention means is placed in the open position to allow viewing of the entire external video signal $S_{EXT}$ (block 82).

Although the foregoing invention has been described in some detail by way of illustration and example for purposes of clarity and understanding, it may be readily apparent to those of ordinary skill in the art in light of the teachings of this invention that certain changes and modifications may be made thereto without departing from the spirit or scope of the appended claims.

We claim:

1. A method for uniformly aging a cathode ray tube (CRT) in a display device, the display device including a display screen with a screen aspect ratio, the method comprising:

receiving an external video signal having a signal aspect ratio different from the screen aspect ratio;

illuminating a primary region of the CRT in response to the external video signal, whereby a secondary region of the CRT is not illuminated in response to the external video signal;

deriving an equalization video signal from the external video signal based on the signal aspect ratio; and illuminating the secondary CRT region in response to the equalization video signal.

2. The method of claim 1, wherein the signal aspect ratio is greater than the screen aspect ratio.

3. The method of claim 2, wherein the signal aspect ratio is 16:9 and the screen aspect ratio is 4:3.

4. The method of claim 1, wherein the signal aspect ratio is less than the screen aspect ratio.

5. The method of claim 4, wherein the signal aspect ratio is 4:3 and the screen aspect ratio is 16:9.

6. The method of claim 1, wherein the equalization video signal derivation step comprises duplicating a portion of the external video signal, the external video signal portion corresponding to a portion of the primary CRT region adjacent to the secondary CRT region.

7. The method of claim 1, wherein the equalization video signal derivation step comprises mirroring a portion of the external video signal, the external video signal portion corresponding to a portion of the secondary CRT region adjacent to the secondary CRT region.

8. The method of claim 1, further comprising preventing user viewing of the equalization video signal.

9. The method of claim 8, wherein the step of preventing user viewing of the equalization video signal comprises covering the secondary CRT region.

10. The method of claim 8, wherein the step of preventing user viewing of the equalization video signal comprises covering the inside of a television screen associated with the CRT.

11. The method of claim 8, wherein the step of preventing user viewing of the equalization video signal comprises covering the outside of a television screen associated with the CRT.

12. The method of claim 1, further comprising combining the external video signal and the equalization video signal into a composite video signal.

13. The method of claim 12, wherein the external video signal and the equalization video signal are combined temporally into the composite video signal.

14. The method of claim 1, wherein the secondary CRT region is immediately adjacent the primary region.

15. The method of claim 1, wherein the secondary CRT region occupies the remainder of the CRT not occupied by the primary CRT region.

16. A method for uniformly aging a cathode ray tube (CRT) in a display device, the display device including a display screen having a screen aspect ratio, the method comprising:

receiving an external video signal having a signal aspect ratio different from the screen aspect ratio, the external video signal configured for illuminating a primary region of the CRT;

deriving an equalization video signal from the external video signal based on the signal aspect ratio, the equalization video signal configured for illuminating a secondary region of the CRT;

combining the equalization video signal and external video signal into a composite video signal; and illuminating the CRT in response to the composite video signal.

17. The method of claim 16, wherein the equalization video signal derivation step comprises digitizing the external video signal, storing the digitized external video signal in a memory, and reading the digitized external video signal out of the memory as a digitized equalization video signal.

18. The method of claim 17, wherein the signal combination step comprises temporally combining the equalization video signal and the external video signal.

19. The method of claim 16, wherein the equalization video signal derivation and signal combination steps comprise digitizing the external video signal, storing the digitized external video signal in a memory, and reading the digitized external video signal out of the memory as a digitized composite video signal.

20. The method of claim 16, wherein the equalization video signal derivation step comprises filtering the external video signal.

21. The method of claim 20, wherein the signal combination step comprises temporally combining the equalization video signal and the external video signal.

22. The method of claim 16, wherein the equalization video signal derivation step comprises duplicating a portion of the external video signal.

23. The method of claim 16, wherein the equalization video signal derivation step comprises mirroring a portion of the external video signal.

24. The method of claim 16, wherein the secondary CRT region is immediately adjacent the primary region.

25. The method of claim 16, wherein the secondary CRT region occupies the remainder of the CRT not occupied by the primary CRT region.

26. A display device, comprising:

a cathode ray tube (CRT);

a display screen having a screen aspect ratio;

means for receiving an external video signal having a signal aspect ratio different from the screen aspect ratio, such that a primary region of the CRT is illuminated and a secondary region of the CRT is non-illuminated in response to the external video signal; and means for deriving an equalization video signal from the external video signal based on the signal aspect ratio, such that the secondary CRT region is illuminated in response to the equalization video signal.

27. The display device of claim 26, further comprising means for combining the external video signal and equalization video signal into a composite video signal.

28. The display device of claim 26, wherein the signal aspect ratio is greater than the screen aspect ratio.

29. The display device of claim 26, wherein the signal aspect ratio is less than the screen aspect ratio.

30. The display device of claim 26, wherein the equalization video signal derivation means duplicates a portion of the external video signal.

31. The display device of claim 26, wherein the equalization video signal derivation means mirrors a portion of the external video signal.

32. The display device of claim 28, further comprising means for preventing viewing of a secondary image generated in response to the equalization video signal.

33. The display device of claim 27, wherein the equalization video signal derivation means comprises an analog-to-digital converter electrically coupled to the signal receiving means, a memory electrically coupled to the output of the analog-to-digital converter, a control circuit electrically coupled to the memory for reading out digitized data from the memory as a digitized equalization video signal, and a digital-to-analog converter electrically coupled to the output of the memory to convert the digitized equalization video signal into the equalization video signal; and wherein the signal combination means comprises a switch electrically coupled to the signal receiving means and the output of the digital-to-analog converter.

34. The display device of claim 27, wherein the equalization video signal derivation means and the signal combination means comprises an analog-to-digital converter electrically coupled to the receiving means, a memory electrically coupled to the output of the analog-to-digital converter, a control circuit electrically coupled to the memory for reading out digitized data from the memory as a digitized composite video signal, the digitized composite video signal composed of the external video signal and the equalization video signal, and a digital-to-analog converter electrically coupled to the output of the memory to convert the digitized composite video signal into a composite video signal.

35. The display device of claim 27, wherein the equalization video signal derivation means comprises a filter electrically coupled to the signal receiving means, and the signal combination means comprises a delay circuit electrically coupled to the signal receiving means in parallel with the filter, and a switch electrically coupled to the filter and the delay circuit.

36. The display device of claim 26, wherein the secondary CRT region is immediately adjacent the primary region.

37. The display device of claim 26, wherein the secondary CRT region occupies the remainder of the CRT not occupied by the primary CRT region.

* * * * *

UNITED STATES PATENT AND TRADEMARK OFFICE
CERTIFICATE OF CORRECTION

PATENT NO. : 6,359,398 B1
DATED : March 19, 2002
INVENTOR(S) : Nakajima et al.

It is certified that error appears in the above-identified patent and that said Letters Patent is hereby corrected as shown below:

Title page,
Item [75], Inventors, please change the citizenship of Yoshimitsu Nakajima from "(US)" to -- (JP) --.

Column 2,
Line 62, please change "response-to" to -- response to --.

Column 3,
Line 19, please change "duplicating of mirroring" to -- duplicating or mirroring --.

Signed and Sealed this

Twenty-second Day of October, 2002

Attest:

Attesting Officer

JAMES E. ROGAN
*Director of the United States Patent and Trademark Office*